United States Patent
Izutsu et al.

(10) Patent No.: US 6,179,968 B1
(45) Date of Patent: *Jan. 30, 2001

(54) METHOD AND APPARATUS FOR TREATING GAS BY IRRADIATION OF ELECTRON BEAM

(75) Inventors: Masahiro Izutsu; Yoshitaka Iizuka; Kazuaki Hayashi, all of Tokyo (JP)

(73) Assignee: Ebara Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/147,556

(22) PCT Filed: Jul. 24, 1997

(86) PCT No.: PCT/JP97/02562

§ 371 Date: Jan. 20, 1999

§ 102(e) Date: Jan. 20, 1999

(87) PCT Pub. No.: WO98/04336

PCT Pub. Date: Feb. 5, 1998

(30) Foreign Application Priority Data

Jul. 25, 1996 (JP) .................................................... 8-196303

(51) Int. Cl.[7] ............................ B01D 53/00; C07C 1/00; C01B 17/00; A61N 5/00; B01J 19/08
(52) U.S. Cl. ................................. 204/157.3; 204/157.44; 204/157.46; 204/157.49; 204/158.2; 422/186; 250/492.3
(58) Field of Search ..................... 204/157.44, 157.46, 204/157.3, 158.2, 157.49; 250/492.3; 422/186

(56) References Cited

U.S. PATENT DOCUMENTS

| 4,882,020 | 11/1989 | Maezawa et al. ............... 204/157.3 |
| 5,244,552 | 9/1993 | Namba et al. .................... 204/157.3 |
| 5,834,772 | 11/1998 | Baumgardner et al. ............ 250/288 |

FOREIGN PATENT DOCUMENTS

| 294658 | * 12/1988 | (EP) . |
| 313989 | * 5/1989 | (EP) . |
| 716873 | * 6/1996 | (EP) . |
| 1-115440 | 5/1989 | (JP) . |
| 7-031844 | * 7/1993 | (JP) . |
| 7-31844 | 2/1995 | (JP) . |
| 8-164324 | 6/1996 | (JP) . |

* cited by examiner

Primary Examiner—Kathryn Gorgos
Assistant Examiner—Edna Wong
(74) Attorney, Agent, or Firm—Oblon, Spivak, McClelland, Maier & Neustadt, P.C.

(57) ABSTRACT

A method and apparatus for treating gas by irradiation with an electron beam. Flue gas discharged from a fuel combustion facility is treated with an electron beam to remove sulfur oxides and/or nitrogen oxides. Ammonia is added to the flue gas and the mixed gas is irradiated with an electron beam in a process vessel. A dust collector receives the gas and collects a by-product mainly composed of ammonium sulfate and/or ammonium nitrate which is produced by the reaction in the process vessel. A gas-contacting portion extending from the process vessel to the dust collector is cooled either wholly or partly, to a dew point of the gas or below.

18 Claims, 5 Drawing Sheets

F I G. 3
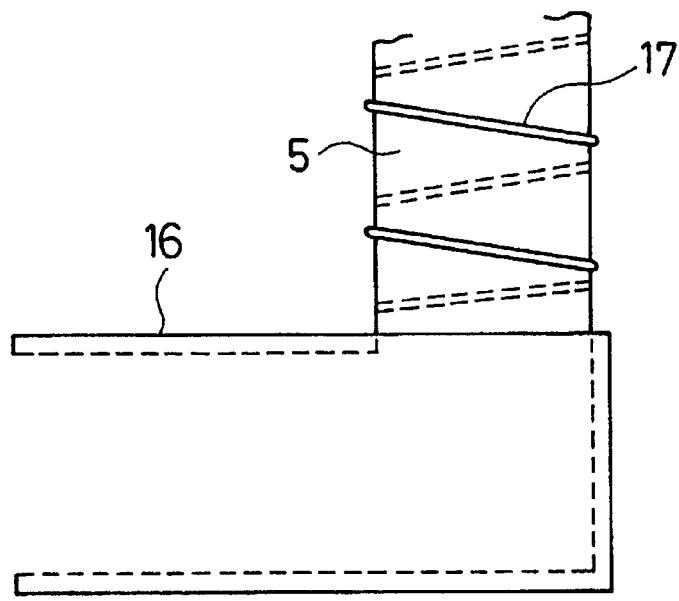
F I G. 4
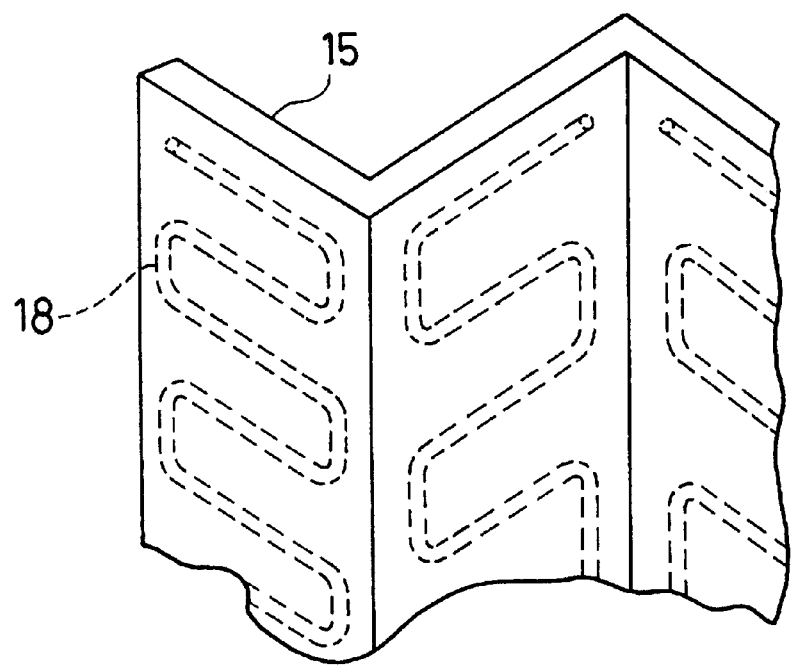

F I G. 5
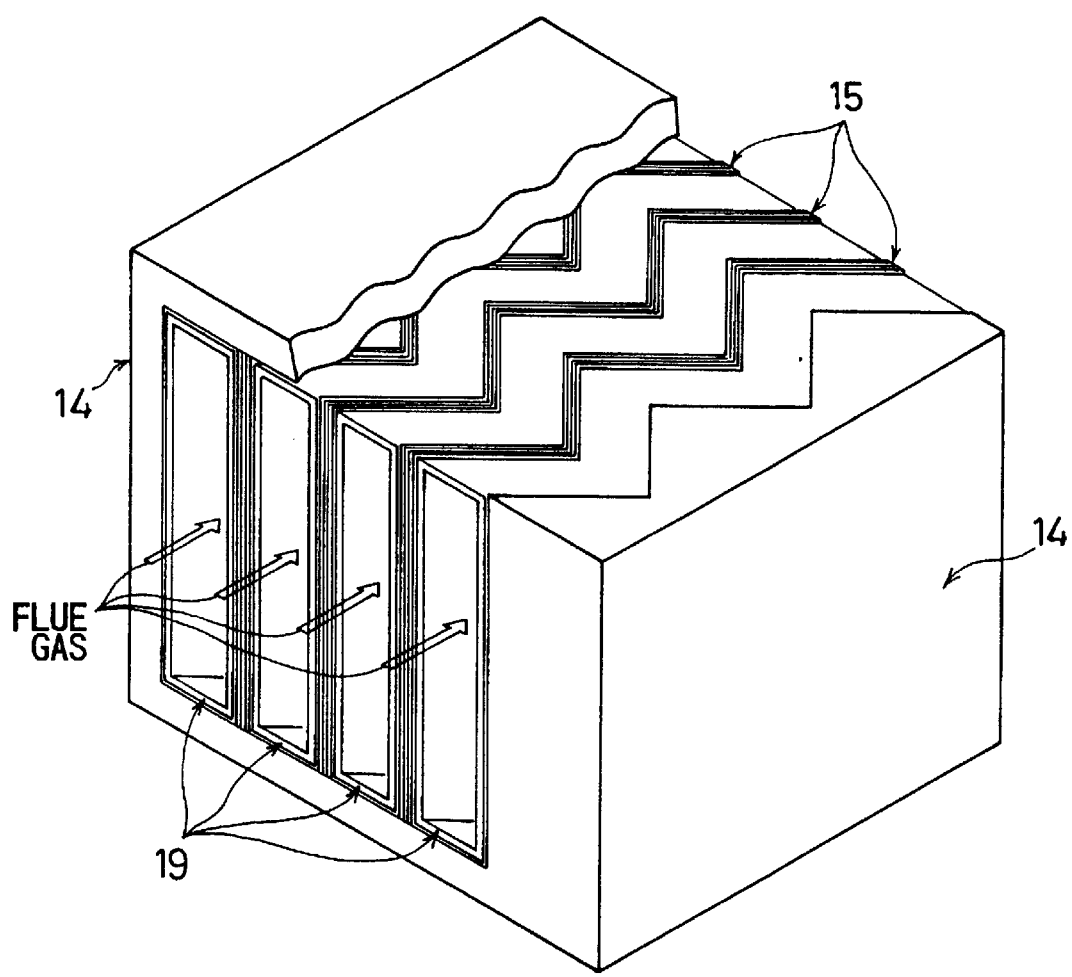

METHOD AND APPARATUS FOR TREATING GAS BY IRRADIATION OF ELECTRON BEAM

BACKGROUND OF THE INVENTION

1. Field of the Invention

The present invention relates to a method and an apparatus for treating gas such as flue gas by irradiation of electron beam, and more particularly to a method and an apparatus for treating gas containing sulfur oxides and/or nitrogen oxides by injection of ammonia and irradiation of electron beam to thereby remove sulfur oxides and/or nitrogen oxides therefrom.

2. Discussion of the Background

As economy develops, more and more energy is demanded. Amidst the continuous growth of energy demand, energy source is still dependent on fossil fuels such as coal and petroleum. However, the harmful products or pollutants generated by burning of fossil fuels are responsible for global pollution. To prevent the release of pollutants into the atmosphere and to stop the pollution of global environment, development work is being carried out at an accelerated pace to create a flue gas treatment system for installation in fuel combustion plant such as thermal power plants. There are still many areas of improvement to meet problems such as the complicated configuration of the equipment requiring a large number of control variables and the need for large-scale waste water treatment systems requiring sophisticated treatment technology.

In an effort to solve these problems, a flue gas treatment system in which flue gas discharged from the fuel combustion facility such as a boiler is treated by irradiation of electron beam has been developed.

In this system, ammonia is injected into gas containing sulfur oxides and/or nitrogen oxides, and the mixed gas is irradiated with electron beam to remove the sulfur oxides and/or the nitrogen oxides therefrom in the form of reaction by-product (hereinafter referred to as by-product). However, this by-product mainly composed of ammonium sulfate and/or ammonium nitrate tends to be deposited on a passage for allowing the treated gas to pass therethrough. There have been made various attempts to prevent deposition of by-product mainly composed of ammonium sulfate and/or ammonium nitrate in such an electron-beam process.

According to one of the attempts, the speed of a gas flow after irradiation of electron beam is set to 10 m/s or less, preferably 5 m/s or less, as disclosed in Japanese patent publication No. 3-65211. According to another attempt, the temperature of a gas-contacting portion from an electron-beam irradiation area to a by-product collecting area is kept in a range of 80 to 150° C., preferably 100 to 150° C., as disclosed in Japanese laid-open patent publication No. 7-31844.

The former attempt is disadvantageous in that an apparatus downstream of irradiation area of electron beam and/or a cross-sectional area of a duct need to be large, resulting in a large-sized facility. The latter attempt is problematic as it requires a heat source for raising the temperature of the gas-contacting portion. Further, both attempts fail to completely prevent the deposition of by-product, but allow by-product to be deposited at an accelerated rate once it starts being deposited.

It has been proposed in International application No. PCT/JP97/00772 to surround a passage having inlet and outlet openings with a shielding wall and place partition plates and/or inner partition walls in the shielded passage in order to shield X-rays that are generated by irradiation of electron beam. If the proposed structure is applied to a duct extending from a process vessel to a by-product collector in the flue gas treatment system, then a portion of the duct is constructed as the shielded passage and the partition plates and/or inner partition walls are provided in the shielded passage. Generally, it is known that the by-product tends to be deposited in locations where the gas flow is turbulent. Consequently, in the proposed structure, since the gas flow is caused to be turbulent by the partition plate and/or the inner partition wall in the shielded passage, the by-product will be deposited at a greater rate on the partition plate and/or the inner partition wall or thereabouts.

SUMMARY OF THE INVENTION

It is therefore an object of the present invention to provide a method and an apparatus for treating gas containing sulfur oxides and/or nitrogen oxides by injection of ammonia and irradiation of electron beam to thereby remove sulfur oxides and/or nitrogen oxides therefrom, while preventing an apparatus and/or a duct from a process vessel to a by-product collector from being clogged with by-product that would mainly be composed of ammonium sulfate and/or ammonium nitrate.

According to one aspect of the present invention, there is provided a method of treating gas by irradiation of electron beam, comprising the steps of: adding ammonia to gas containing sulfur oxides and/or nitrogen oxides in a process vessel; irradiating gas with electron beam in the process vessel to remove the sulfur oxides and/or the nitrogen oxides from the gas; collecting by-product produced by reaction in the process vessel by a collector; and cooling at least a part of a gas-contacting portion extending from the process vessel to the collector to a dew point of the gas or below.

In the present invention, reaction is carried out under the atmospheric pressure. The dew point of the gas is mainly affected by the concentration of water vapor in the gas although it is slightly affected by the composition of the gas. The relationship between the concentration (%) of water vapor and the dew point (°C.) is given in Table shown below.

| Water vapor concentration (%) | Dew point (° C.) |
|---|---|
| 2 | 18 |
| 4 | 29 |
| 6 | 36 |
| 8 | 42 |
| 10 | 46 |
| 12 | 50 |
| 14 | 53 |
| 16 | 56 |
| 18 | 58 |
| 20 | 60 |
| 25 | 65 |
| 30 | 69 |

When the gas-contacting portion extending from the process vessel to the collector is cooled, either wholly or partly, to a dew point of the gas or below, the water vapor contained in the gas is condensed in the gas-contacting portion, and by-product which contacts the gas-contacting portion or adheres to the gas-contacting portion is dissolved and washed away by the condensed water. Therefore, the by-product is prevented from being deposited on or adhering to the gas-contacting portion. The gas-containing portion may be cooled only in a region where by-product tends to be deposited due to gas flow turbulences, or only in an upper region thereof whereas a lower region thereof may be washed by the condensed water flowing down from the upper region.

The method may further comprises the step of spraying condensed water, produced in the gas-contacting portion, into the gas either before or after irradiation of electron beam.

According to another aspect of the present invention, there is provided an apparatus for treating gas by irradiation of electron beam, comprising: a process vessel for being supplied with gas containing sulfur oxides and/or nitrogen oxides; a supply device for supplying ammonia to the gas in the process vessel; an electron accelerator for irradiating the gas with electron beam in the process vessel; a collector for collecting by-product produced by reaction; a duct extending from the process vessel to the collector for allowing the gas to pass therethrough; and a cooling structure for cooling at least a part of a gas-contacting portion extending from the process vessel to the collector to a dew point of the gas or below.

The apparatus further comprises a plurality of spaced partition plates or walls disposed in the duct, and the gas-contacting portion comprises outer surfaces of the partition plates or walls with a cooling structure for cooling at least a part of a gas-contacting portion.

The cooling structure may comprise a cooling jacket provided on the duct, or a cooling water pipe at a gas-contacting portion or gas-noncontacting portion to cool gas-contacting portion. The cooling structure may comprise a cooling water passage provided in the partition plate or wall.

Particularly, in the case where the partition plates and/or the partition walls are provided in the duct, a division duct may be provided between the partition plates. The division duct may be provided with a cooling jacket thereon or a cooling water pipe at a gas-contacting portion or a gas-noncontacting portion to cool the gas-contacting portion, wholly or partly, to a dew point of the gas or below.

Since the condensed water produced at the gas-contacting portion contains dissolved by-product which is mainly composed of ammonium sulfate and/or ammonium nitrate, it may be corrosive. Therefore, it is desirable that the portion which contacts the condensed water is made of anticorrosion material such as stainless steel, or has a lining to protect base material. Particularly, in case of providing the partition plates or walls in the duct, it is effective to provide a division duct between the partition plates or walls and allow the portion of the division duct which contacts the condensed water to be made of anticorrosion material such as stainless steel.

The condensed water contains dissolved or suspended by-product which is mainly composed of ammonium sulfate and/or ammonium nitrate. If necessary, the condensed water may be filtered or mixed with water or aqueous solution such as aqueous ammonia, and then sprayed into the gas in the process vessel. The condensed water is then vaporized due to the sensible heat of the gas, the heat generated by irradiation of electron beam, and the heat generated by the chemical reaction, and the by-product dissolved or suspended in the condensed water is dried. The dried by-product is thereafter collected, together with by-product which has not been dissolved or suspended in the condensed water, by the collector.

The spraying device may be disposed in one of an upstream region, a middle region, and a downstream region of the process vessel so that the spraying device may spray water condensed at the gas-contacting portion into the process vessel.

The above and other objects, features, and advantages of the present invention will become apparent from the following description when taken in conjunction with the accompanying drawings which illustrate preferred embodiments of the present invention by way of examples.

BRIEF DESCRIPTION OF DRAWINGS

FIG. 3 is a fragmentary elevational view of the duct downstream of the process vessel of the apparatus shown in FIG. 1, the duct including a portion having a cooling jacket and a portion around which a cooling water pipe is spirally wound;

FIG. 4 is a fragmentary perspective view of one of the inner partition plates with cooling water passages defined therein;

FIG. 5 is a fragmentary perspective view showing a modified embodiment of the partition plates.

DETAILED DESCRIPTION OF THE PREFERRED EMBODIMENTS

An apparatus for treating gas by irradiation of electron beam according to the present invention will be described below with reference to FIGS. 1 through 5.

Figure 1:
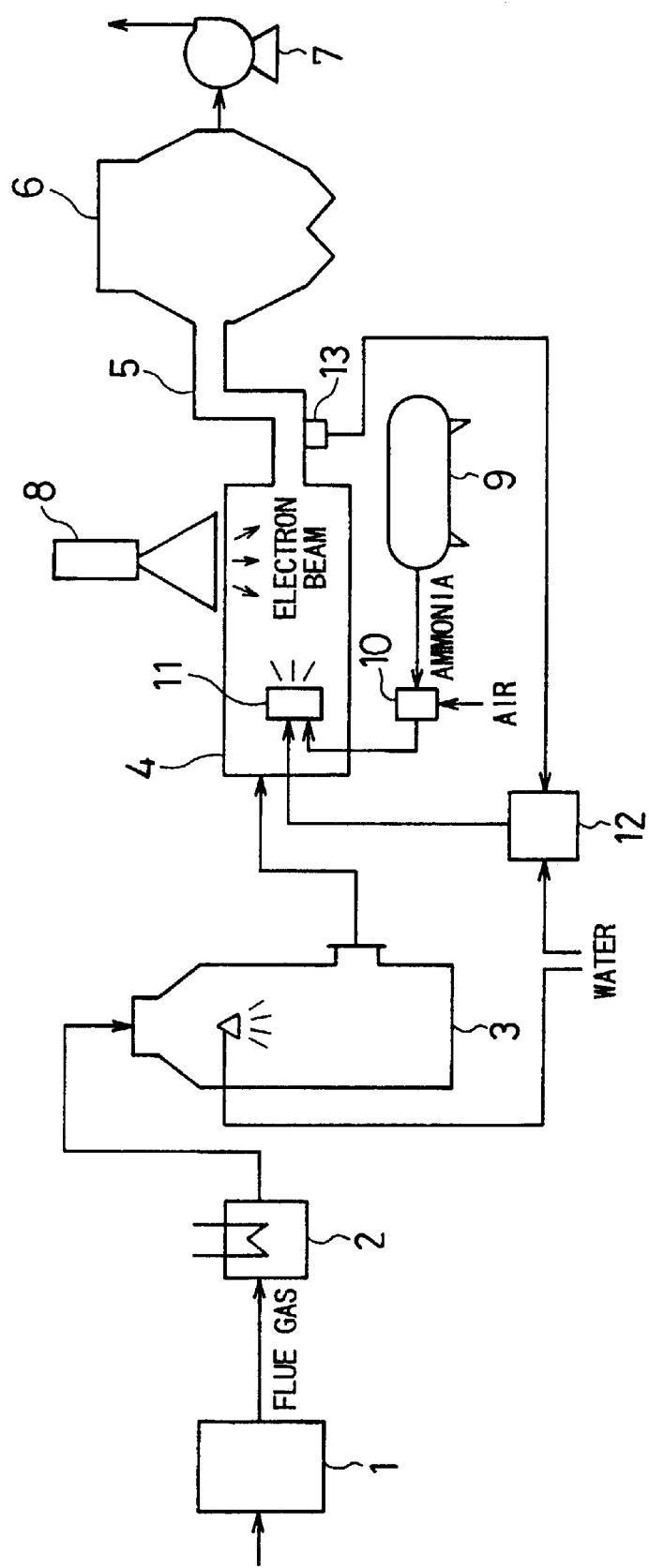
FIG. 1 is a schematic diagram of an apparatus for treating gas by irradiation of electron beam according to the present invention.

As shown in FIG. 1, the apparatus according to the present invention includes a boiler 1 which is a kind of fuel combustion facility and discharges flue gas, a heat exchanger 2 for cooling the flue gas discharged from the boiler 1, a water-spray cooling tower 3 for further cooling the flue gas from the heat exchanger 2 with a spray of cooling water, and a process vessel 4 for being supplied with the cooled flue gas from the water-spray cooling tower 3. The apparatus further includes a duct 5 provided downstream of the process vessel 4, an electrostatic precipitator 6 for collecting by-product particles from the gas discharged from the process vessel 4 through the duct 5, and an induced draft fan 7 for discharging the gas from the electrostatic precipitator 6 out of the apparatus. An electron accelerator 8 is provided at the process vessel 4 for irradiating the gas with electron beam. Ammonia is supplied from an ammonia supply facility 9 to a line mixer 10, the supplied ammonia is mixed with air in the line mixer 10, and the mixed gas is then supplied to a two-fluid nozzle 11 in the process vessel 4. In the two-fluid nozzle 11, the mixed gas from the line mixer 10 and a mixed liquid from a mixed liquid tank 12 are mixed in a gas-liquid mixing compartment thereof. The mixed liquid contained in the mixed liquid tank 12 is a mixture of water and condensed water from a water drain port 13 formed in the duct 5. The gas-liquid mixture produced by the two-fluid nozzle 11 is sprayed into the flue gas in the process vessel 4 either before or after irradiation of electron beam. The two-fluid nozzle 11 may be positioned in one of an upstream region, a middle region, and a downstream region of the process vessel 4. Since the condensed water which is discharged from the water drain port 13 and mixed with water is sprayed into the process vessel 4 and is evaporated in the process vessel 4 or the duct 5, generation of waste water can be prevented and a waste water treatment system is not required in the gas treatment system.

Figure 2:
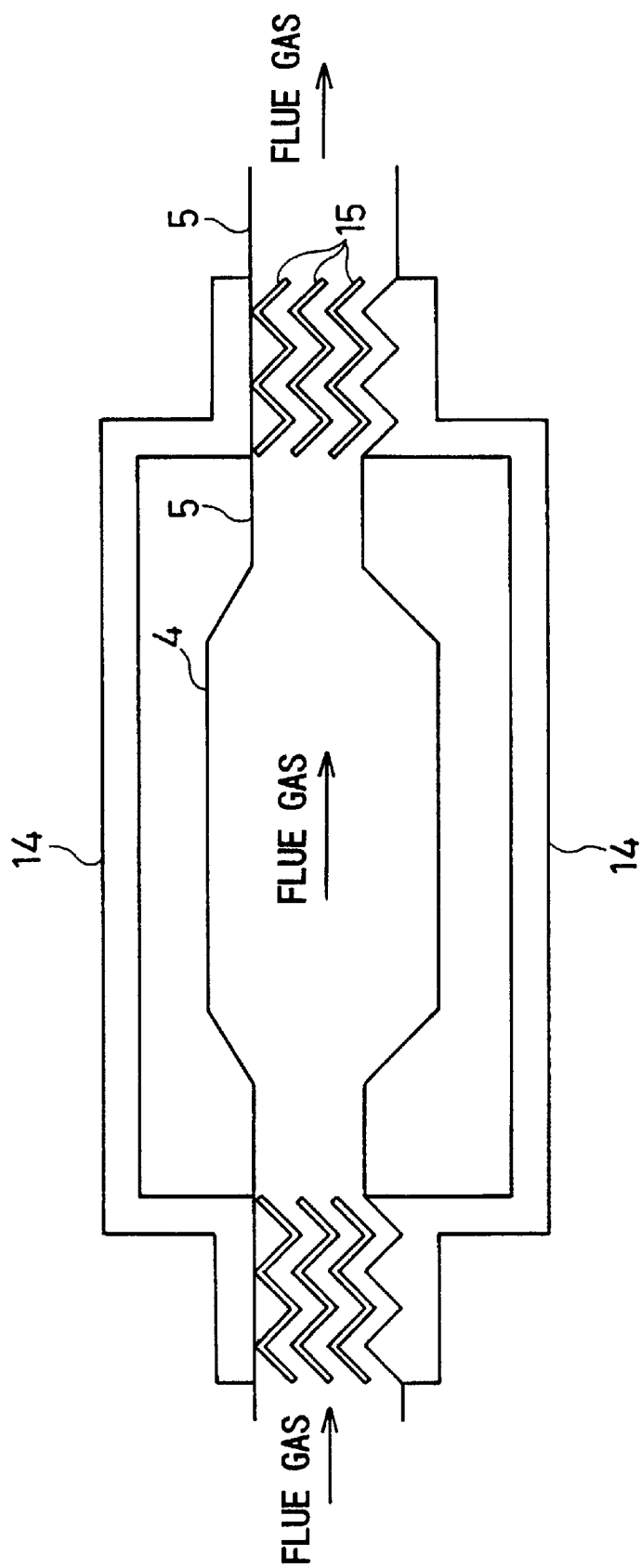
FIG. 2 is a cross-sectional view of a process vessel surrounded by a shielding wall in the apparatus shown in FIG. 1 and inner partition plates disposed in a duct which extends downstream of the process vessel and is connected to an opening of the shielding wall.

As shown in FIG. 2, the process vessel 4 is surrounded by a shielding wall 14, and parallel spaced partition plates 15 having a plurality of folds are placed in the duct 5 which extends downstream of the process vessel 4 and is connected to an opening of the shielding wall 14.

As shown in FIG. 3, the duct 5 includes an upstream portion having a cooling jacket 16 thereon and a downstream portion around which a cooling water pipe 17 is spirally wound. Cooling water is supplied to the cooling jacket 16 and the cooling water pipe 17, respectively to cool the inner surface of the duct 5 serving as a gas-contacting portion.

As shown in FIG. 4, each of the partition plates 15 having a plurality of folds has a cooling water passage 18 housed therein which extends in a meandering pattern. Cooling water is also supplied to the cooling water passage 18 to cool the outer surfaces of the partition plates 15. The outer surface of the partition plate 15 also serves as a gas-contacting portion. The cooling water passage may be provided in a wall of the process vessel 4, or a wall of the duct 5.

FIG. 5 is a modified embodiment of the partition plates 15. As shown in FIG. 5, a division duct 19 having a cooling jacket thereon is provided between the shielding wall 14 and the partition plate 15, and between the adjacent two partition plates 15, respectively. The division duct 19 has a folded passage therein having a rectangular cross-section. Cooling water is supplied to the cooling jackets on the division ducts to cool the inner surfaces of the division ducts 19 serving as a gas-contacting portion. The flue gas flows in each of the division ducts 19. The flue gas does not contact the partition plates 15 directly, but contacts the inner surfaces of the division ducts 19 which are cooled by the cooling jackets to a dew point of the gas or below, and hence water vapor in the gas is condensed and by-product which contacts the inner surfaces of the division ducts 19 or adheres to the surfaces of the division ducts 19 is dissolved and washed away by the condensed water.

INVENTIVE EXAMPLE

An inventive experiment was conducted on the apparatus shown in FIGS. 1 through 5. In FIG. 1, flue gas of 1,500 m³ N/h containing 700 ppm of sulfur oxides and 150 ppm of nitrogen oxides and discharged from the boiler 1 was cooled to 150° C. by the heat exchanger 2, and then further cooled to 60° C. by the water-spray cooling tower 3. Thereafter, the flue gas was introduced into the process vessel 4. Ammonia of 2.1 m³ N/h supplied from the ammonia supply facility 9 was mixed with air of 8.0 m³ N/h in the line mixer 10, and the mixed gas was then mixed with a mixed liquid of 13.3 kg/h supplied from the mixed liquid tank 12 in a gas-liquid mixing chamber of the two-fluid nozzle 11 in the process vessel 4. The mixture of the gas and liquid was then sprayed and evaporated in the process vessel 4 at an inlet thereof, and was irradiated with electron beam of 10 kGy from the electron accelerator 8. At an outlet of the process vessel 4, the temperature of the gas was 65° C., and a dew point of the gas was 50° C. thereat. Thereafter, the gas was led through the duct 5 downstream of the process vessel 4 into the electrostatic precipitator 6. After by-product was collected by the electrostatic precipitator 6, the gas was discharged into the atmosphere by the induced draft fan 7. At an outlet of the induced draft fan 7, the concentration of sulfur oxides was 35 ppm, the concentration of nitrogen oxides was 20 ppm, and the concentration of by-product particles was 5 mg/m³N.

The process vessel 4 was surrounded by the shielding wall 14 shown in FIG. 2, and the partition plates 15 having a plurality of folds were placed in the duct 5 which extended downstream of the process vessel 4 and was connected to the opening of the shielding wall 14. The intensity of X-rays in the outsides of the shielding wall 14 and the opening was 0.1 $\mu$Sv/h or less.

The gas flowed in the process vessel 4 at a speed of 0.1 m/s. In the duct 5, the gas flowed at a speed of 10 m/s in a region where no partition plates 15 were located, and at a speed of 15 m/s in a region where the partition plates 15 were located.

At this time, as shown in FIG. 3, the duct 5 downstream of the process vessel 4 included the upstream portion having the cooling jacket 16 and the downstream portion having the cooling water pipe 17 so as to suppress the highest temperature of the duct 5 where it is in contact with the gas to 45° C. Further, the partition plates 15 had the respective cooling water passages 18 so as to suppress the highest temperature of the partition plates 15 where they are in contact with the gas to 45° C.

On the inner surfaces of the duct 5 downstream of the process vessel 4 and the surfaces of the partition plates 15, water of 5.0 kg/h was condensed, and the concentration of by-product in the condensed water was 6%. The condensed water was withdrawn from the water drain port 13 (see FIG. 1) and supplied to the mixed liquid tank 12 where it was mixed with water of 8.3 kg/h.

After the apparatus continuously operated for 120 hours, it experienced no pressure loss. A subsequent examination of the duct 5 downstream of the process vessel 4 indicated that no by-product was observed on the inner surfaces of the duct 5 and the surfaces of the partition plates 15.

COMPARATIVE EXAMPLE

Figure 6:
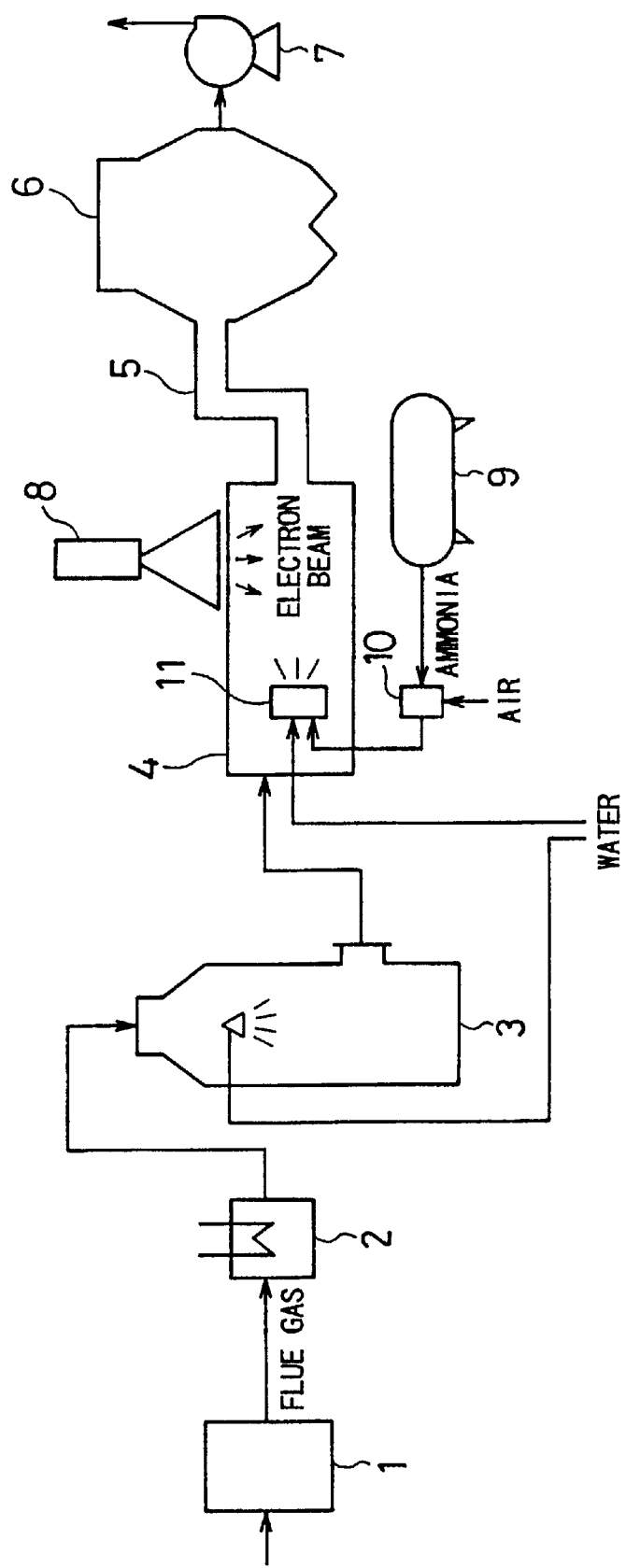
FIG. 6 is a schematic diagram of an apparatus for treating gas by irradiation of electron beam according to a comparative example.

A comparative experiment was conducted on an apparatus for treating gas by irradiation of electron beam, shown in FIG. 6. The apparatus shown in FIG. 6 differs from the apparatus shown in FIG. 1 in that it has no mixed liquid tank 12 and no water drain port 13, and also in that the duct 5 has no cooling jacket 16 and no cooling water pipe 17, and the partition plates 15 have no cooling water passage 18 therein.

In FIG. 6, flue gas of 1,500 m³ N/h containing 700 ppm of sulfur oxides and 150 ppm of nitrogen oxides and discharged from the boiler 1 was cooled to 150° C. by the heat exchanger 2, and then further cooled to 60° C. by the water-spray cooling tower 3. Thereafter, the flue gas was introduced into the process vessel 4. Ammonia of 2.1 m³ N/h supplied from the ammonia supply facility 9 was mixed with air of 8.0 m³ N/h in the line mixer 10, and the mixed gas was then mixed with water of 13 kg/h in a gas-liquid mixing chamber of the two-fluid nozzle 11 in the process vessel 4. The mixture of the gas and water was then sprayed and evaporated in the process vessel 4 at an inlet thereof, and was irradiated with electron beam of 10 kGy from the electron accelerator 8. At an outlet of the process vessel 4, the temperature of the gas was 65° C. Thereafter, the gas was led through the duct 5 downstream of the process vessel 4 into the electrostatic precipitator 6. After by-product was collected by the electrostatic precipitator 6, the gas was discharged into the atmosphere by the induced draft fan 7. At an outlet of the induced draft fan 7, the concentration of sulfur oxides was 35 ppm, the concentration of nitrogen oxides was 20 ppm, and the concentration of dust particles was 5 mg/m³N.

The process vessel 4 was surrounded by the shielding wall 14 shown in FIG. 6, and the partition plates 15 having a plurality of folds were placed in the duct 5 which extended downstream of the process vessel 4 and was connected to the opening of the shielding wall 14. The intensity of X-rays in the outsides of the shielding wall 14 and the opening was 0.1 $\mu$Sv/h or less.

The exhaust gas flowed in the process vessel 4 at a speed of 0.1 m/s. In the duct 5, the gas flowed at a speed of 10 m/s in a region where no partition plates 15 were located, and at a speed of 15 m/s in a region where the partition plates 15 were located.

After the apparatus continuously operated for 120 hours, it experienced a high pressure loss due to a deposit of by-product on the inner surface of the duct 5 and the surfaces of the partition plates 15. The apparatus was shut off because the high pressure loss preventing the induced draft fan 7 from operating. A subsequent examination of the duct 5 showed that the by-product deposited on the inner surfaces of the duct 5 and the surfaces of the partition plates 15 had a weight of 100 kg.

As is apparent from the above description, the present invention offers the following advantages:

In the process for treating gas containing sulfur oxides and/or nitrogen oxides by injection of ammonia and irradiation of electron beam to thereby remove sulfur oxides and/or nitrogen oxides therefrom, an apparatus and/or a duct from a process vessel to a by-product collector can be prevented from being clogged with by-product that would mainly be composed of ammonium sulfate and/or ammonium nitrate. Therefore, the treatment process of the gas can be carried out safely and stably.

Although a certain preferred embodiment of the present invention has been shown and described in detail, it should be understood that various changes and modifications may be made therein without departing from the scope of the appended claims.

The present invention is suitable for a flue gas treatment system in which sulfur oxides and/or nitrogen oxides contained in the combustion flue gas of various fuels such as coal or petroleum can be removed from the gas at a high efficiency.

What is claimed is:

1. A method of treating gas by irradiation of electron beam, comprising the steps of:
    adding ammonia to gas containing sulfur oxides and/or nitrogen oxides in a process vessel;
    irradiating gas with electron beam in said process vessel to remove the sulfur oxides and/or the nitrogen oxides from the gas;
    collecting by-product produced by reaction in said process vessel by a collector; and
    cooling at least a part of a gas-contacting portion extending from said process vessel to said collector to a dew point of the gas or below.

2. A method according to claim 1, further comprising the step of:
    spraying condensed water, produced in said gas-contacting portion, into the gas either before or after irradiation of the electron beam.

3. An apparatus for treating gas by irradiation of electron beam, comprising:
    a process vessel for being supplied with gas containing sulfur oxides and/or nitrogen oxides;
    a supply device for supplying ammonia to the gas in said process vessel;
    an electron accelerator for irradiating the gas with electron beam in said process vessel;
    a collector for collecting by-product produced by reaction;
    a duct extending from said process vessel to said collector for allowing the gas to pass therethrough; and
    a cooling structure means configured for cooling at least a part of a gas-contacting portion extending from said process vessel to said collector to a dew point of the gas or below.

4. An apparatus according to claim 3, wherein said gas-contacting portion comprises an inner surface of said duct.

5. An apparatus according to claim 4, wherein said cooling structure means comprises a cooling jacket provided on said duct.

6. An apparatus according to claim 4, wherein said cooling structure means comprises a water pipe provided on said duct.

7. An apparatus according to claim 4, wherein said duct comprises a plurality of division ducts, and said cooling structure means comprises a cooling jacket provided in said division duct.

8. An apparatus according to claim 4, wherein said supply device is disposed in one of an upstream region, a middle region, or a downstream region of said process vessel so that said supply device sprays water condensed at said gas-contacting portion into said process vessel.

9. An apparatus according to claim 3, further comprising:
    a plurality of spaced partition plates or walls disposed in said duct;
    wherein said gas-contacting portion comprises outer surfaces of said partition plates or walls.

10. An apparatus according to claim 9, wherein said cooling structure means comprises a cooling water passage provided in at least one of said process vessel, said duct, or said partition plates or walls.

11. An apparatus according to claim 9, wherein said cooling structure means comprises a cooling jacket provided on said duct.

12. An apparatus according to claim 9, wherein said cooling structure means comprises a cooling water pipe provided on said duct.

13. An apparatus according to claim 9, wherein said duct comprises a plurality of division ducts, and said cooling structure means comprises a cooling jacket provided in said division duct.

14. An apparatus according to claim 9, wherein said supply device is disposed in one of an upstream region, a middle region, or a downstream region of said process vessel so that said supply device sprays water condensed at said gas-contacting portion into said process vessel.

15. An apparatus according to claim 3, wherein said cooling structure means comprises a cooling jacket provided on said duct.

16. An apparatus according to claim 3, wherein said cooling structure means comprises a cooling water pipe provided on said duct.

17. An apparatus according to claim 3, wherein said duct comprises a plurality of division ducts, and said cooling structure means comprises a cooling jacket provided in said division duct.

18. An apparatus according to claim 3, wherein said supply device is disposed in one of an upstream region, a middle region, or a downstream region of said process vessel so that said supply device sprays water condensed at said gas-contacting portion into said process vessel.

* * * * *